United States Patent
Shimizu et al.

(10) Patent No.: US 10,522,846 B2
(45) Date of Patent: Dec. 31, 2019

(54) FUEL CELL END PLATE WITH RESIN LAYER AND PROTRUSION

(71) Applicants: TOYOTA JIDOSHA KABUSHIKI KAISHA, Toyota-shi, Aichi-ken (JP); TOYODA GOSEI CO., LTD., Kiyosu-shi, Aichi-ken (JP); TAIHO KOGYO CO., LTD., Toyota-shi, Aichi-ken (JP)

(72) Inventors: Tatsuhiko Shimizu, Toyota (JP); Hitoshi Hamada, Gotenba (JP); Yutaka Hotta, Toyota (JP); Tatsuya Tokumasu, Toyota (JP); Tadanobu Ota, Kiyosu (JP); Yoshiki Nakamura, Kiyosu (JP)

(73) Assignees: Toyota Jidosha Kabushiki Kaisha, Toyota-shi, Aichi-ken (JP); Taiho Kogyo Co., Ltd., Toyota-shi, Aichi-ken (JP); Toyoda Gosei Co., Ltd., Kiyosu-shi, Aichi-ken (JP)

( * ) Notice: Subject to any disclaimer, the term of this patent is extended or adjusted under 35 U.S.C. 154(b) by 138 days.

(21) Appl. No.: 15/668,074

(22) Filed: Aug. 3, 2017

(65) Prior Publication Data

US 2018/0047995 A1 Feb. 15, 2018

(30) Foreign Application Priority Data

Aug. 12, 2016 (JP) .................. 2016-158502

(51) Int. Cl.
*H01M 8/02* (2016.01)
*H01M 8/2485* (2016.01)
(Continued)

(52) U.S. Cl.
CPC ........... *H01M 8/02* (2013.01); *H01M 8/0276* (2013.01); *H01M 8/0286* (2013.01);
(Continued)

(58) Field of Classification Search
CPC .... H01M 8/02; H01M 8/0297; H01M 8/0286; H01M 8/2485; H01M 8/0276; H01M 2008/1095; H01M 8/2475
See application file for complete search history.

(56) References Cited

U.S. PATENT DOCUMENTS

2004/0157106 A1* 8/2004 Sugiura .................. H01M 8/02
429/465
2005/0260479 A1* 11/2005 Raiser ................ H01M 8/0276
429/434

FOREIGN PATENT DOCUMENTS

| JP | 2013-123844 | 6/2013 |
| JP | 2014-100815 | 6/2014 |
| JP | 2015-8086 | 1/2015 |

OTHER PUBLICATIONS

Machine translation of JP 2015-008086, Takeyama et al., "Fuel Cell Stack" (Year: 2015).*

* cited by examiner

*Primary Examiner* — Robert S Carrico
*Assistant Examiner* — Kwang Han
(74) *Attorney, Agent, or Firm* — Finnegan, Henderson, Farabow, Garrett & Dunner, LLP

(57) ABSTRACT

A fuel cell stack 100 includes a fuel cell stack 10, and an end plate 30 placed at an end of the fuel cell stack 10. The end plate 30 includes a metallic plate-like body 32, and a resin layer 60 formed on a surface 32b of the plate-like body 32. The plate-like body 32 includes flow holes 39 for a reactant gas and a cooling medium, and a stripe-shaped protrusion 38 protruding from the surface 32b and which divides the surface 32b into an inner area containing the flow holes 39 and an outer area outside the inner area. The protrusion 38 includes a vertical portion 38a protruding from the surface 32b, and a jutted portion 38b jutted from a distal end of the (Continued)

vertical portion 38*a* toward the inner area. The resin layer 60 is formed in the inner area to cover a surface 38*as* of the vertical portion 38*a* facing the inner area as well as at least part of the jutted portion 38*b*.

1 Claim, 11 Drawing Sheets

(51) Int. Cl.
*H01M 8/0276* (2016.01)
*H01M 8/0286* (2016.01)
*H01M 8/0297* (2016.01)
*H01M 8/2475* (2016.01)
*H01M 8/1018* (2016.01)

(52) U.S. Cl.
CPC ....... *H01M 8/0297* (2013.01); *H01M 8/2485* (2013.01); *H01M 8/2475* (2013.01); *H01M 2008/1095* (2013.01)

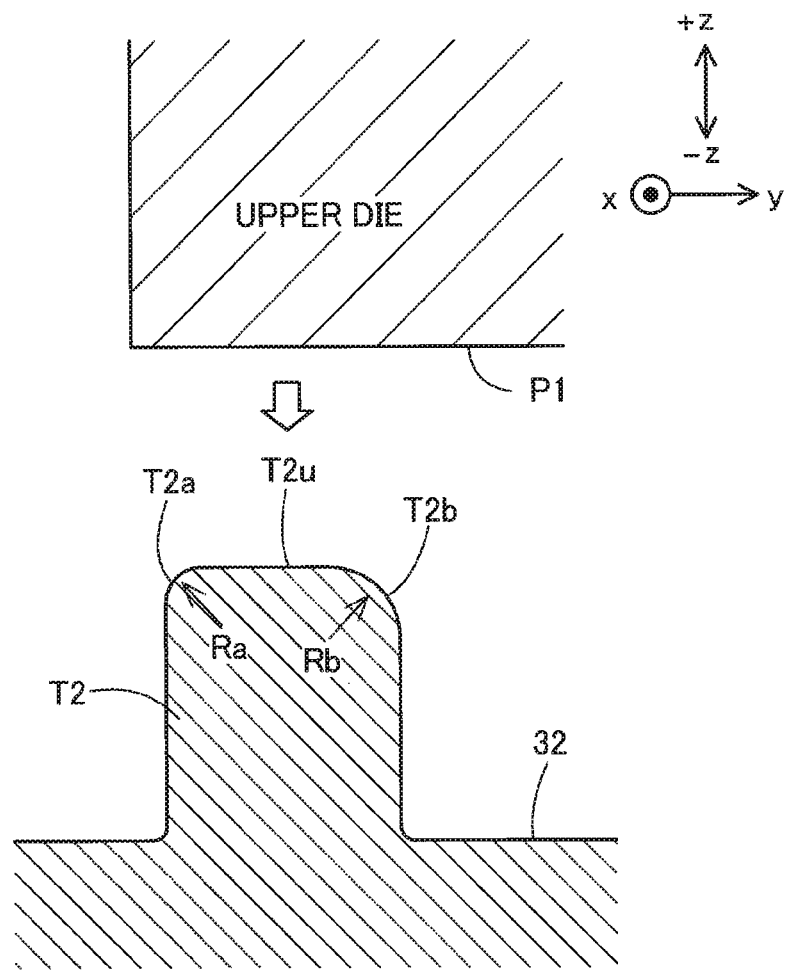

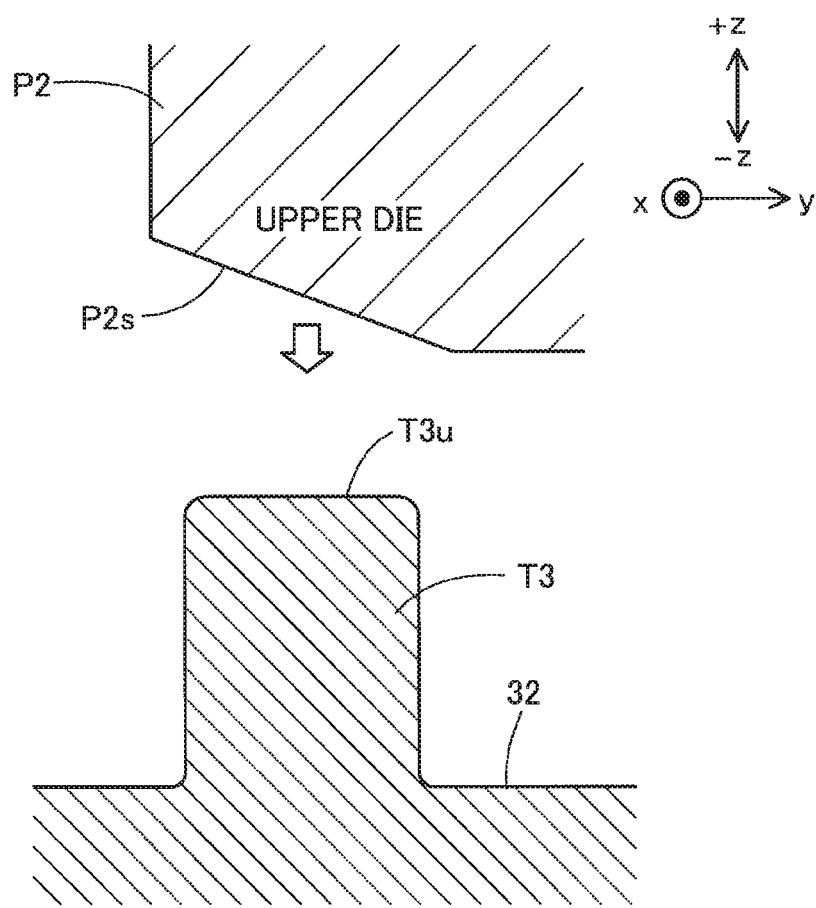

FUEL CELL END PLATE WITH RESIN LAYER AND PROTRUSION

CROSS REFERENCE TO RELATED APPLICATIONS

This application claims priority to Japanese Patent Application No. 2016-158502 filed on Aug. 12, 2016, the entire contents of which are incorporated by reference herein.

BACKGROUND

Field

The present disclosure relates to a fuel cell stack.

Related Art

As described in JP 2015-008086A, a conventional fuel cell stack includes a fuel cell stack, and end plates placed at both ends of the fuel cell stack. A metallic plate member of the end plate has flow holes for a cooling medium and a reactant gas, and a resin layer is formed over an area including those flow holes. The resin layer is intended to keep insulation property of a surface in contact with the cooling medium and the reactant gas in the metallic plate member, as well as its chemical resistance.

With the fuel cell stack of the above-described related art, there has been a tendency that when the cooling medium is fed through the cooling-medium flow holes of the end plate, the resin layer may more likely peel from the metallic plate member due to a difference of thermal expansions between the metallic plate member and the resin. Peeling of the resin layer would cause a problem that the insulation property between the end plate and the fuel cell stack cannot be ensured, as well as another problem that the chemical resistance cannot be ensured, allowing metal corrosions to progress.

SUMMARY

The present disclosure, having been accomplished to solve at least part of the above-described problems, may be implemented in the following aspect.

According to an aspect, there is provided a fuel cell stack. The fuel cell stack comprises a fuel cell stack, and an end plate placed at an end of the fuel cell stack. The end plate includes a metallic plate-like body, and a resin layer formed on a surface of the plate-like body. The plate-like body includes flow holes for a reactant gas and a cooling medium, and a stripe-shaped protrusion protruding from the surface such that the protrusion divides the surface of the plate-like body into an inner area containing the flow holes and an outer area outside the inner area. The protrusion includes a vertical portion protruding from the surface of the plate-like body, and a jutted portion jutted from a distal end of the vertical portion toward the inner area. The resin layer is formed in the inner area to cover a surface of the vertical portion facing the inner area as well as at least part of the jutted portion.

According to the fuel cell stack in this aspect, the jutted portion of the plate-like body of the end plate is formed so as to penetrate into the resin layer. By virtue of this, even with occurrence of a large difference of thermal expansions between the plate-like body of the end plate and the resin layer, expansion and contraction of the resin layer is suppressed by the jutted portion, so that peeling of the resin layer from the plate-like body of the end plate will be suppressed. Thus, there is produced an effect that the insulation property between the end plate and the fuel cell stack, as well as the chemical resistance, will be ensured.

BRIEF DESCRIPTION OF THE DRAWINGS

FIG. 10 is an explanatory view showing Modification 1 of the forming process; and FIG. 11 is an explanatory view showing Modification 2 of the forming process.

DESCRIPTION OF THE EMBODIMENTS

A. Overall Construction of the Fuel Cell Unit

Figure 1:
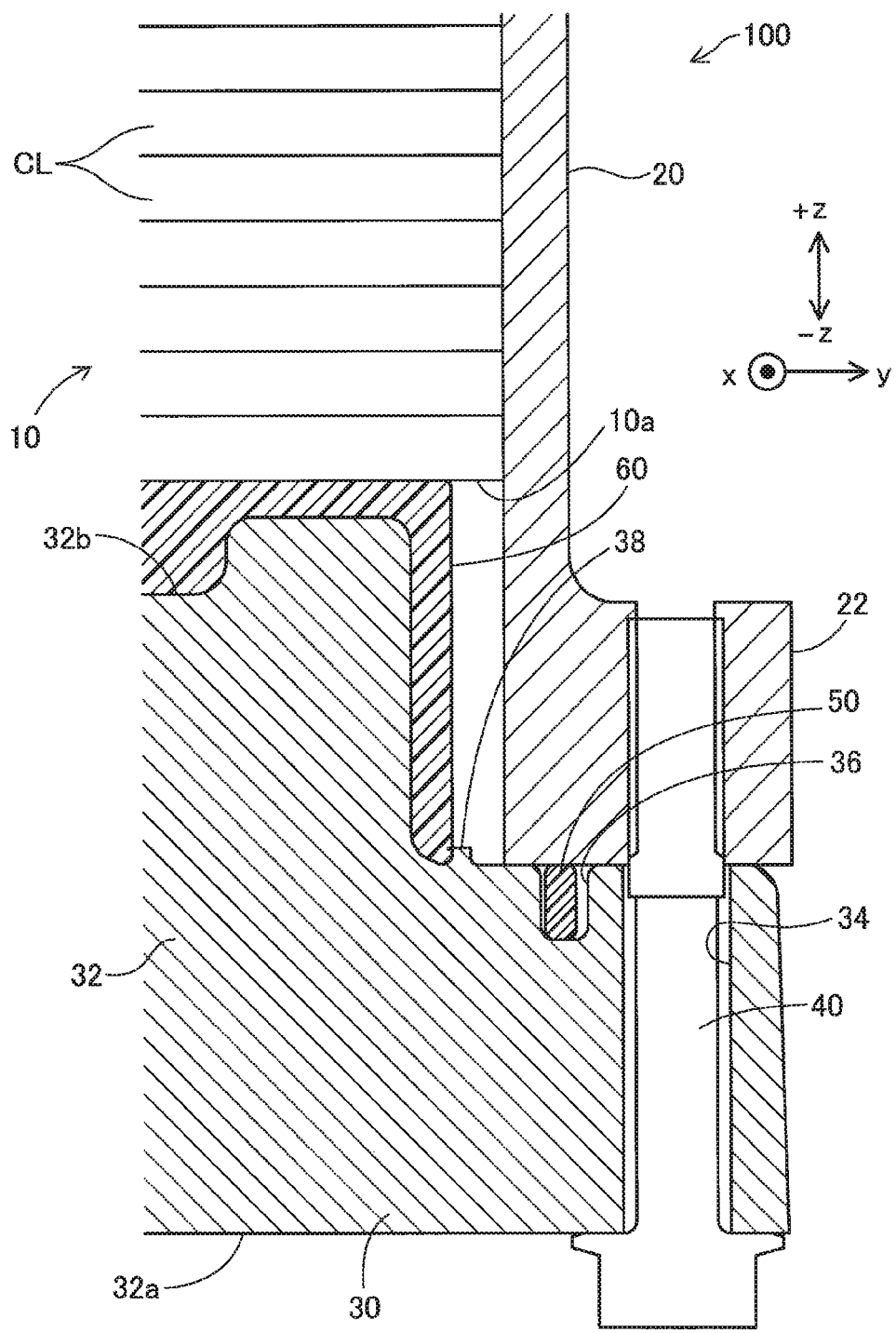
FIG. 1 is an explanatory view showing part of a fuel cell stack as one embodiment of the present disclosure.

FIG. 1 is an explanatory view showing part of a fuel cell stack as one embodiment of the present disclosure. The fuel cell stack 100 includes a fuel cell stack 10, a casing 20, an end plate 30, and a tightening bolt 40.

The fuel cell stack 10 is a multilayer stacked body of plural fuel cells CL. Each fuel cell CL includes an anode, a cathode, an electrolyte, and separators to perform power generation through electrochemical reactions of hydrogen and oxygen. The fuel cell CL may be implemented in many types, and it is of a solid polymer type in this embodiment. In the drawings, there are defined x, y and z directions which perpendicularly cross one another. The Z direction coincides with a stacking direction of the fuel cell stack 10. An upper side of the z direction is referred to as +z direction, and a lower side of the z direction is referred to as −z direction.

The casing 20 is a cylindrical-shaped container for containing the fuel cell stack 10 therein. In the casing 20, the fuel cell stack 10 is contained with its stacking direction (z direction) coincident with a center axis of the casing 20.

The end plate 30 is placed at an end 10*a* in the −z direction (the lower-side end in the figure) of the fuel cell stack 10. The end plate 30 includes a plate-like body 32, and resin layer 60 formed on a surface 32*b* of the plate-like body 32. The plate-like body 32 may be formed of various metal materials having corrosion resistance and rigidity, and it is formed of aluminum in this embodiment. The plate-like body 32 of the end plate 30 includes a surface 32*b* (hereinafter, referred to as 'back surface 32*b*') on which the resin layer 60 is formed, and another surface 32*a* (hereinafter, referred to as 'front surface 32*a*') opposite to the back surface 32*b*. The front surface 32 is provided with auxiliary machines (not shown) such as a hydrogen pump, a gas-liquid separator and an exhaust/drain valve. The fuel cell stack body 10 is placed on the resin layer 60 on the back surface 32b of the plate-like body 32.

An outwardly jutted flange 22 is formed on an entire perimeter of the −z direction-side end of the casing 20. The end plate 30 is fixed to this flange 22 with the tightening bolt 40. Tightening the bolt 40 allows the end plate 30 to tighten the fuel cell stack 10.

B. Structure of the End Plate

Figure 2:
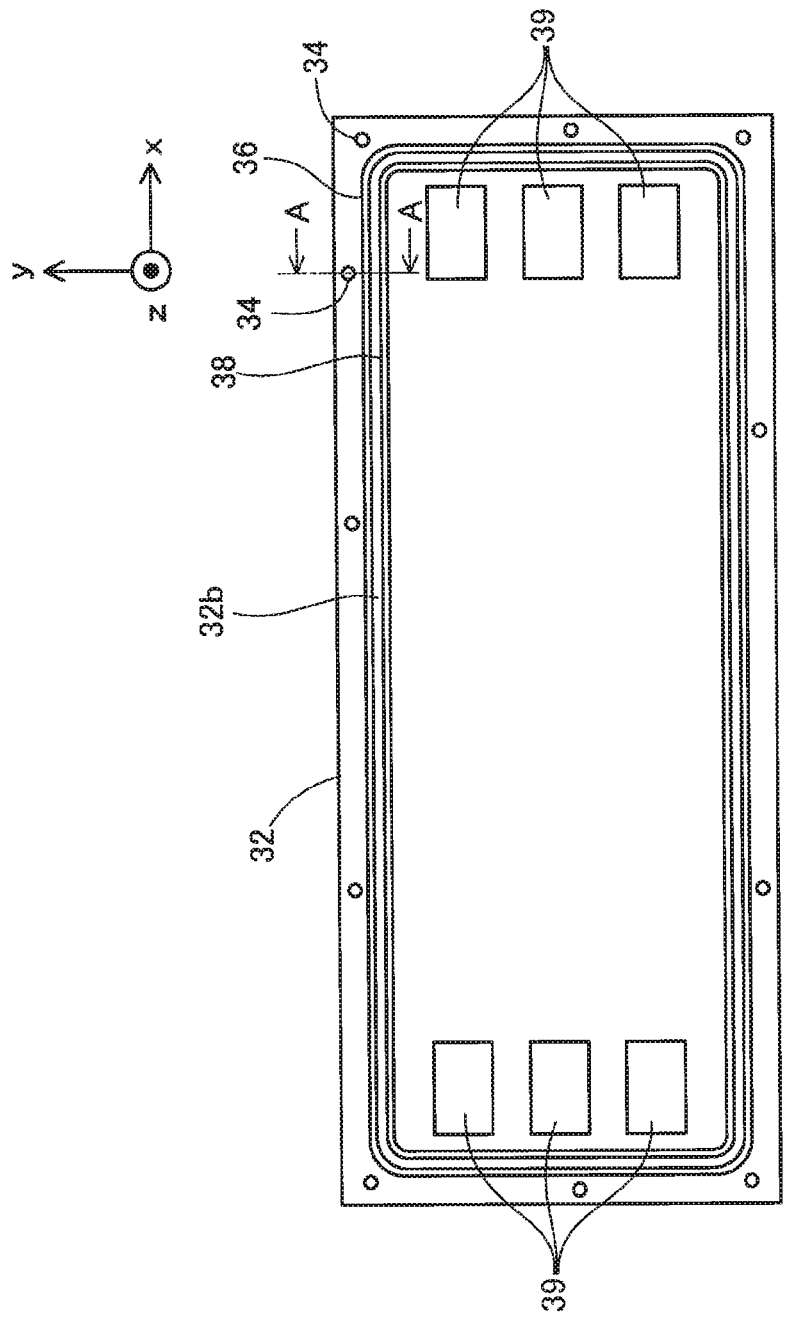
FIG. 2 is a plan view showing a back surface of a plate-like body of the end plate.
Figure 3:
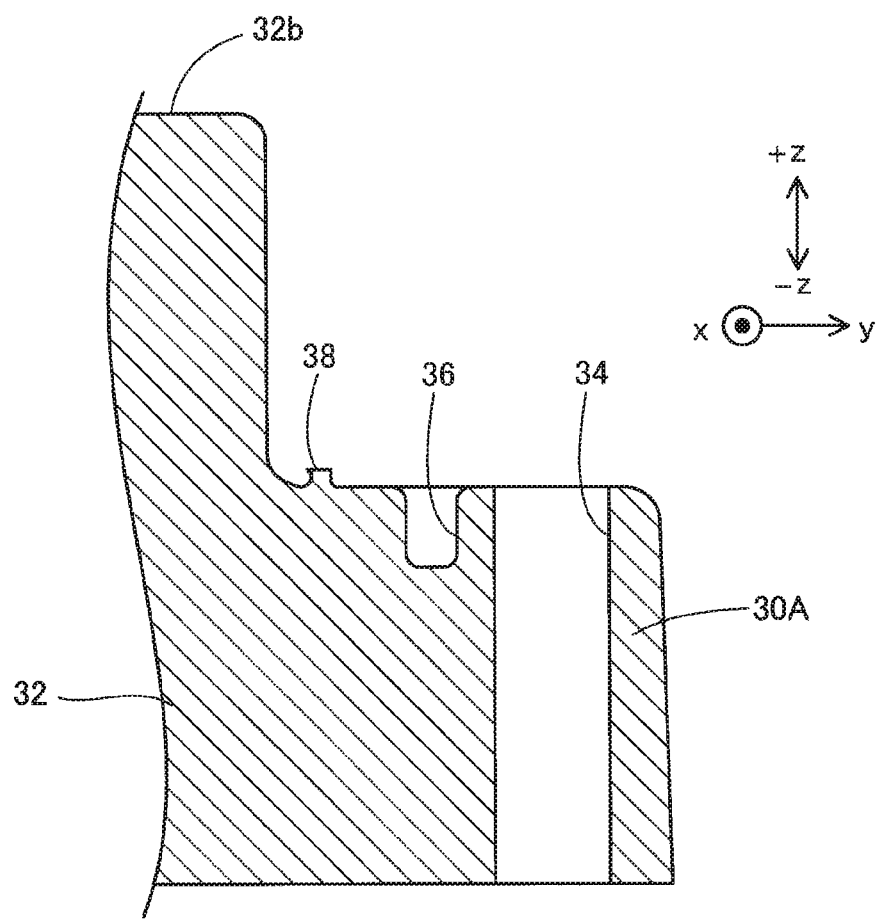
FIG. 3 is a sectional view taken along the line A-A of FIG. 2.

FIG. 2 is a plan view showing the back surface 32b of the plate-like body 32 of the end plate 30. FIG. 3 is a sectional view taken along the line A-A of FIG. 2. At peripheral edges of the plate-like body 32, a plurality of bolt holes 34 are provided. The tightening bolt 40 (FIG. 1) is inserted into each bolt hole 34.

A gasket groove 36 (FIG. 1) for setting a gasket 50 is provided surficially inside the bolt hole 34 on the back surface 32b of the plate-like body 32. Herein, the term 'surficially inside' refers to one side in the back surface 32b of the end plate 30 closer to a center of the back surface 32b. The gasket groove 36 is formed into a continuous closed stripe shape to divide the back surface 32b of the end plate 30 into an inner area and an outer area.

In the back surface 32b of the plate-like body 32 of the end plate 30, a protrusion 38 protruding from the back surface 32b is provided surficially inside the gasket groove 36. The protrusion 38 is formed into a continuous closed stripe shape to divide the inner area, which is defined by the gasket groove 36, further into an inner area and an outer area.

Flow holes 39 (FIG. 2) are formed in the inner area defined by the protrusion 38. The flow holes 39 function as flow paths for air (oxygen) as an oxidizing gas, hydrogen gas, and the cooling medium.

Figure 4:
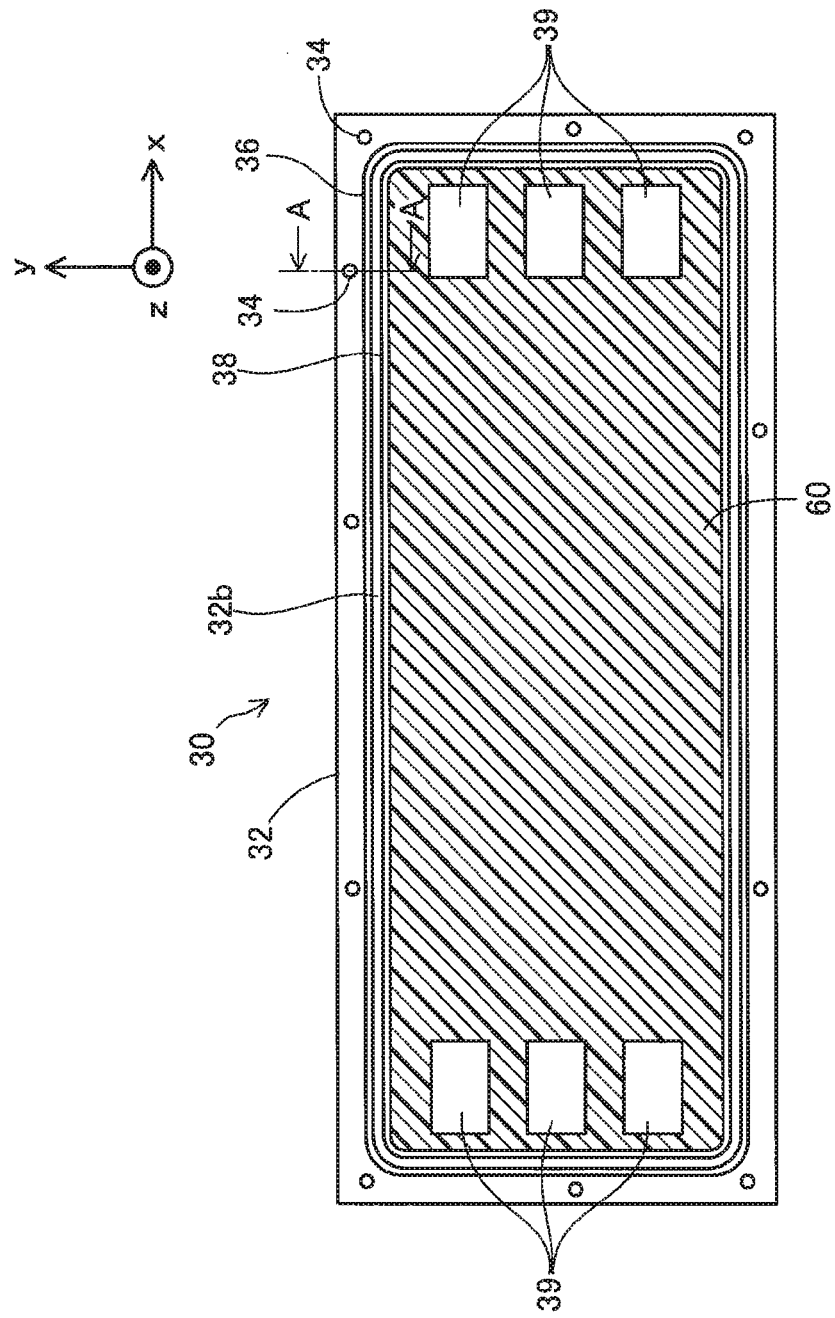
FIG. 4 is a plan view showing the back surface of the end plate on which a resin layer is formed.
Figure 5:
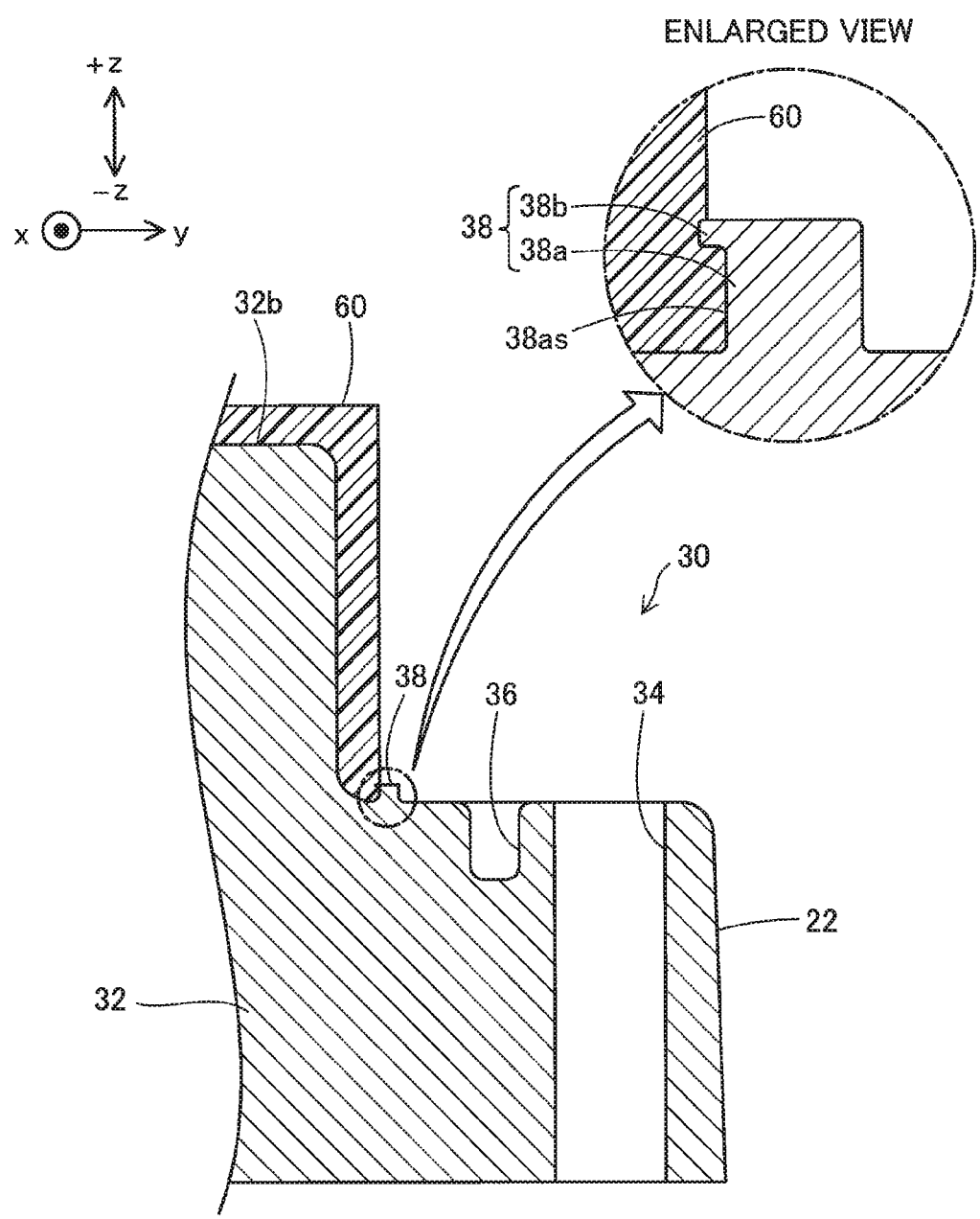
FIG. 5 is a sectional view taken along the line A-A of FIG. 4.

FIG. 4 is a plan view showing the end plate 30 with the resin layer 60. FIG. 5 is a sectional view taken along the line A-A of FIG. 4. As shown in FIGS. 4 and 5, the resin layer 60 is formed in the inner area defined by the protrusion 38. In FIG. 4, the resin layer 60 is depicted as a hatched portion. The resin layer 60 covers the inner area defined by the protrusion 38, so that the end plate 30 is improved in terms of electrical insulation property, as well as chemical resistance, in portions of contact with the fluid flowing through the flow holes 39. The resin of the resin layer 60 is not particularly limited only if it has electrical insulation property and chemical resistance; in this embodiment, PPS (Polyphenylene Sulfide) is used therefor.

An enlarged view at the upper right in FIG. 5 is an enlargement of the protrusion 38 and its neighborhood. As shown in the enlarged view, the protrusion 38 includes a vertical portion 38a protruding from the back surface 32b, and a jutted portion 38b jutted from an end of the vertical portion 38a toward the inner area defined by the protrusion 38.

The jutted portion 38b of the protrusion 38 penetrates into the resin layer 60. More specifically, the resin layer 60 covers the inner area defined by the protrusion 38 so as to cover an inner area-side surface 38as of the vertical portion 38a as well as at least part of the jutted portion 38b. As a result, the jutted portion 38b of the protrusion 38 penetrates into the resin layer 60.

C. Forming Process with Molding Dies

Figure 6:
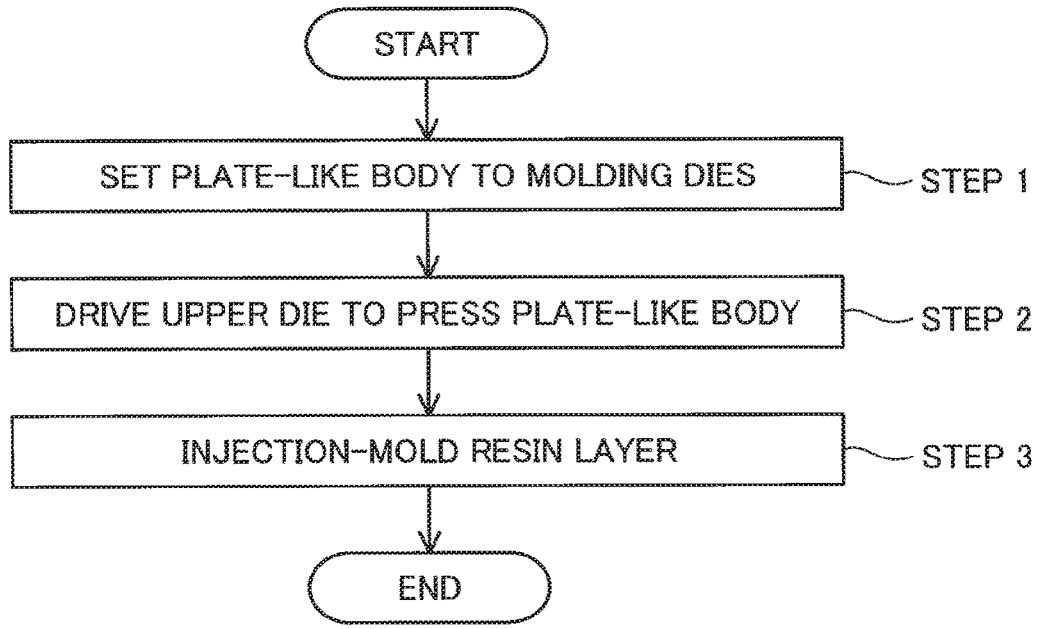
FIG. 6 is a flowchart showing a forming process of a protrusion and the resin layer.

FIG. 6 is a flowchart showing a forming process of the protrusion 38 and the resin layer 60. As shown in the figure, the process is constituted of three steps, Steps 1 to 3. Steps 1 to 3 are executed in this order. Individual Steps 1 to 3 will be explained below in order.

In Step 1, the plate-like body 32 is set to molding dies. The molding dies include a lower die and an upper die. Specifically, in Step 1, the plate-like body 32 is set between the lower die and the upper die.

Figure 7:
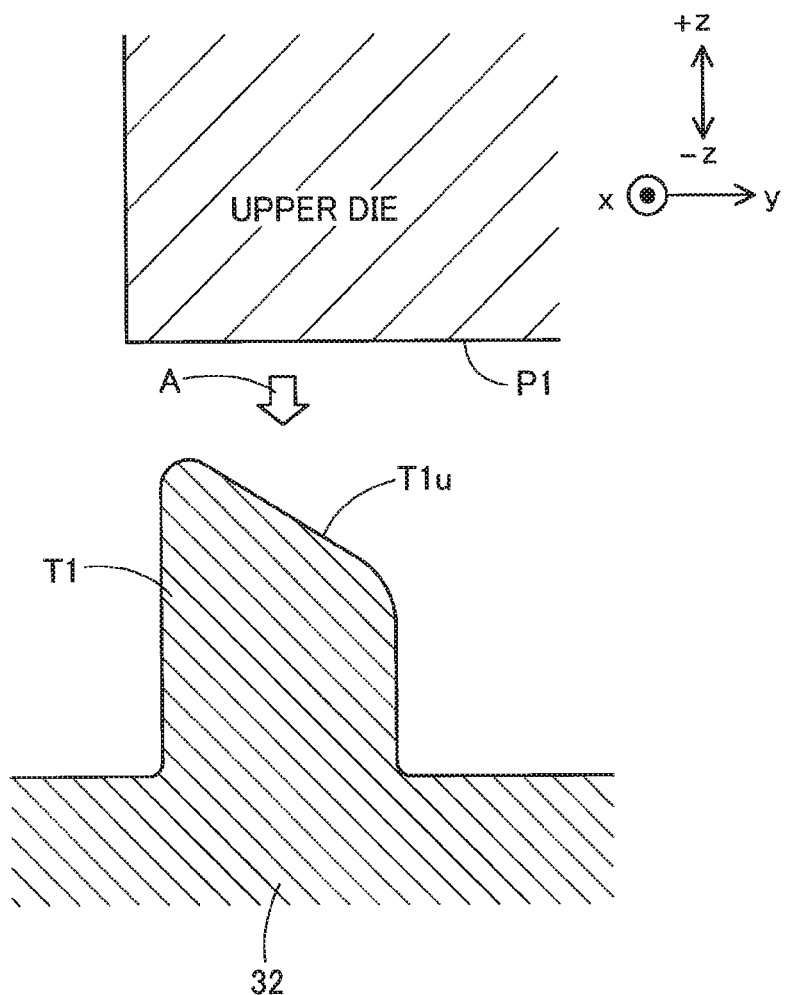
FIG. 7 is an explanatory view showing an aspect in which a plate-like body is set to molding dies by Step 1.

FIG. 7 is an explanatory view showing an aspect in which the plate-like body 32 is set to the molding dies in Step 1. X, y and z directions in this figure coincident with the x, y and z directions in the other figures. For execution of this forming process, an x-y plane is a horizontal surface, and the z direction is a vertical direction. As shown in the figure, the plate-like body 32 is so set that while its surface having a protrusion T1 protruding therefrom is positioned on its upper side, the lower die (not shown) is positioned below and the upper die P1 is positioned above. The protrusion T1, which is to serve as an origin of the protrusion 38 (FIG. 5, etc.), is formed into a continuous closed linear shape like the protrusion 38. In this embodiment, an upper surface T1u of the protrusion T1 is declined from upper left to lower right as in the figure. In addition, in this embodiment, the surface of the upper die P1 facing the lower die is an x-y plane, i.e., a flat surface extending along a horizontal surface.

In Step 2, the upper die P1 is driven so as to be moved downward, i.e., toward the lower die. In other words, in FIG. 7, the upper die P1 is moved in the −z direction as shown by arrow A. As a result, the protrusion T1 of the plate-like body 32 is pressed and shaped by the upper die P1.

Figure 8:
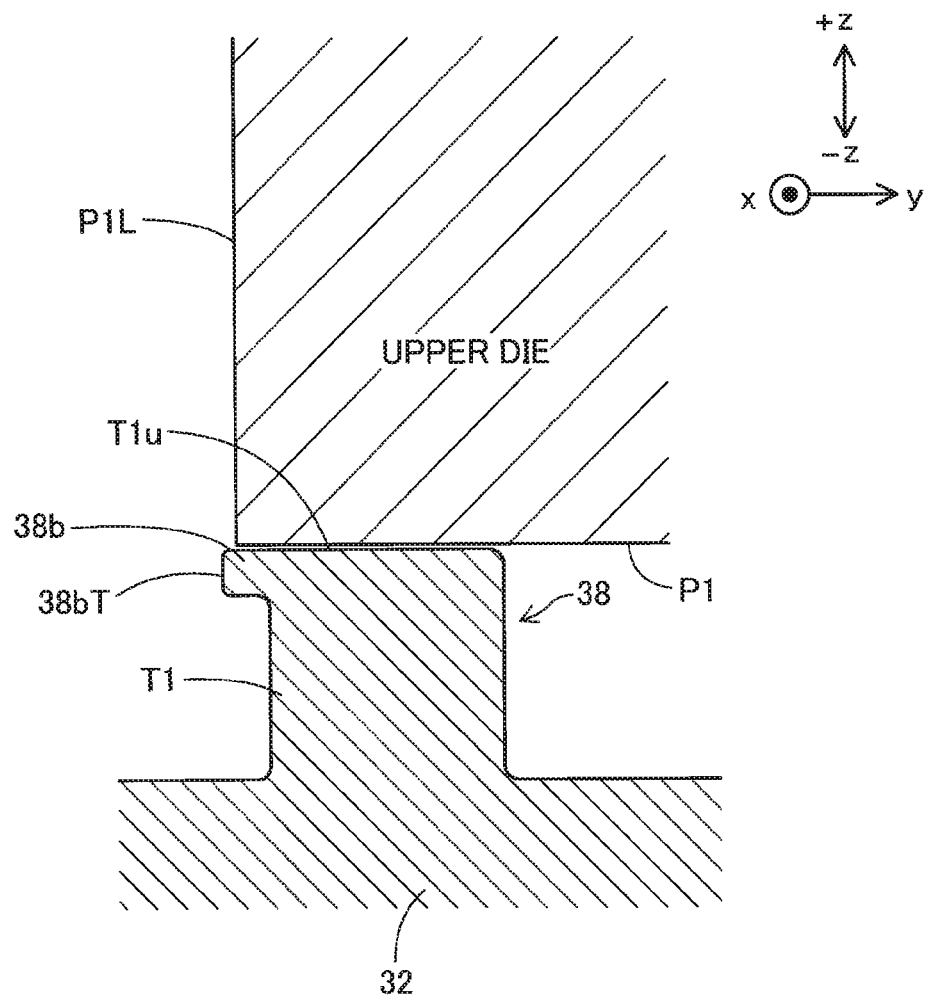
FIG. 8 is an explanatory view showing the plate-like body formed by Step 2.

FIG. 8 is an explanatory view showing the plate-like body 32 shaped by Step 2. Since the upper surface T1u of the protrusion T1 is declined from upper left to lower right, the upper surface T1u of the protrusion T1, when pressed by the upper die P1, is flattened, resulting in a leftward-jutted state as in the figure. As a consequence, the protrusion 38 having the shape depicted in the enlarged view of FIG. 5, i.e. the protrusion 38 having the jutted portion 38b, is formed in the plate-like body 32. In addition, the leftward side is the inward side of the area defined by the protrusion 38.

In this embodiment, a lateral width (y-direction width) of the upper die P1 has such a size that a y-direction left-side end face P1L of the upper die P1 is positioned rightward of a distal end 38bT of the jutted portion 38b. Otherwise, as a modification, the lateral width of the upper die P1 may have such a size that the y-direction left-side end face P1L of the upper die P1 and the distal end 38bT of the jutted portion 38b are positioned at an identical position in the y direction.

In Step 3, injection molding of the resin layer 60 is performed.

Figure 9:
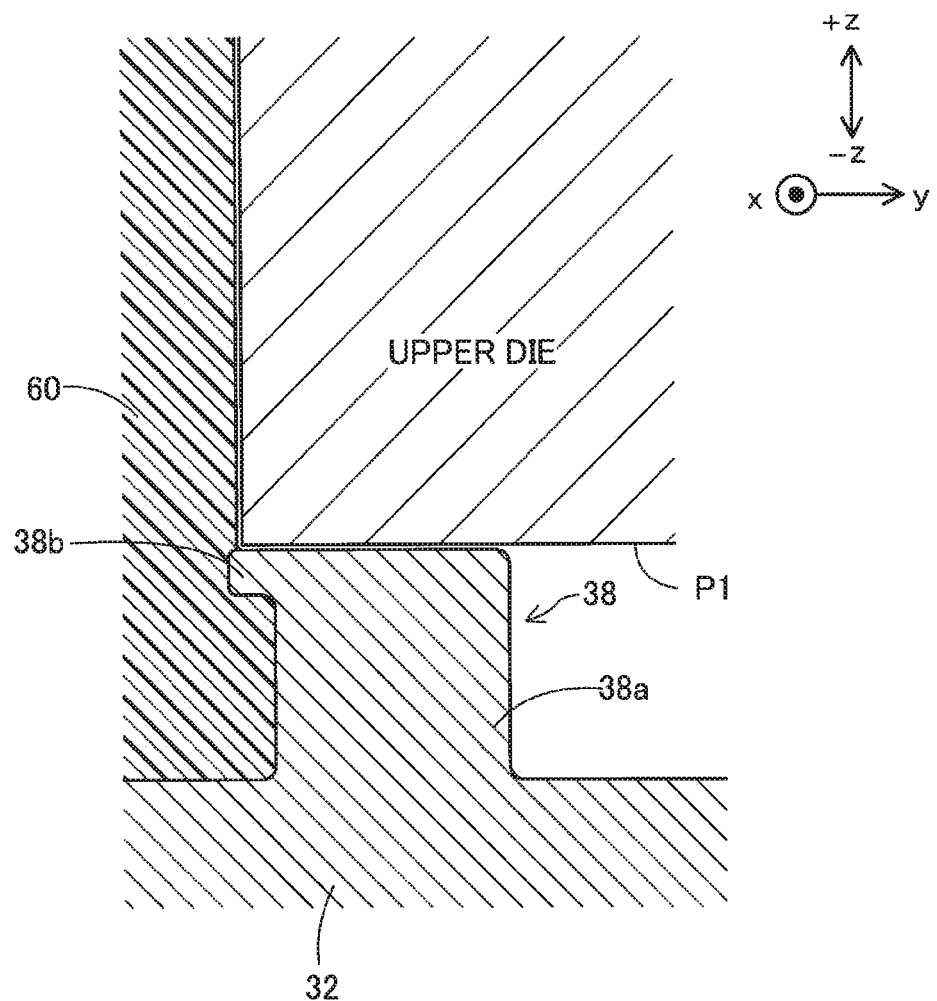
FIG. 9 is an explanatory view showing the plate-like body after the resin layer has been injection molded by Step 3.

FIG. 9 is an explanatory view showing the plate-like body 32 after the resin layer 60 has been injection molded by Step 3. In Step 3, specifically, a resin material is injected toward the left-side surface of the protrusion 38, i.e., its one-side surface having the jutted portion 38b, as well as toward the y-direction left-side end face P1L of the upper die P1 to mold the resin layer. The resin material is pressed and inserted under injection pressure as it is heated to its softening point. Consequently, as shown in FIG. 9, the resin layer 60 is molded so as to cover the left-side surface of the vertical portion 38a, as in the figure, and at least part of the jutted portion 38b in the protrusion 38.

D. Effects of the Embodiment

According to the fuel cell stack 100 as described above, the jutted portion 38b of the protrusion 38 formed in the plate-like body 32 of the end plate 30 is configured to penetrate into the resin layer 60. By virtue of this, even with occurrence of a large difference of thermal expansions between the plate-like body 32 of the end plate 30 and the resin layer 60, expansion and contraction of the resin layer 60 is suppressed by the jutted portion 38b, so that peeling of the resin layer 60 from the plate-like body 32 of the end plate 30 will be suppressed. Thus, there is produced an effect that the insulation property between the end plate 30 and the fuel cell stack 10, as well as the chemical resistance, can be ensured.

E. Modifications

In the foregoing embodiment, the upper surface T1u of the protrusion T1 (FIG. 7) is formed into a declined shape to form the jutted portion 38b in the forming process. However, this is not necessarily limitative. For example, as Modification 1, a protrusion T2 having a shape shown in FIG. 10 may be provided to form the jutted portion 38b. That is, as shown in FIG. 10, the protrusion T2 has an upper surface T2u extending along a horizontal plane, and a y-direction right-side-corner roundness Rb larger than a y-direction left-side-corner roundness Ra. With the plate-like body 32 provided in this shape, pressing the plate-like body 32 by the upper die P1 allows the protrusion 38 to be formed into a shape having the jutted portion 38b.

Furthermore, as shown in FIG. 11, the protrusion T2 may be shaped with the upper surface T2u extending along a horizontal plane while the upper die P2 has, on its one side facing the lower die (not shown), a surface P2s declined from upper left to lower right as in the figure. According to this Modification 2, moving the upper die P2 vertically downward allows the protrusion 38 to be formed into a shape having the jutted portion 38b.

What is claimed is:
1. A fuel cell stack, comprising:
   a fuel cell stack; and
   an end plate placed at an end of the fuel cell stack, the end plate including:
      a metallic plate-like body; and
      a resin layer formed on a surface of the plate-like body,
   wherein the plate-like body includes:
      flow holes for a reactant gas and a cooling medium; and
      a protrusion protruding from the surface, the protrusion extending continuously along the surface of the plate-like body and dividing the surface of the plate-like body into:
         an inner area of the surface enclosed by the protrusion and containing the flow holes; and
         an outer area of the surface outside the protrusion,
      the protrusion including:
         a vertical portion protruding from the surface of the plate-like body; and
         a jutted portion jutted from a distal end of the vertical portion toward the inner area of the surface, and
   wherein the resin layer is formed in the inner area of the surface to cover a surface of the vertical portion facing the inner area of the surface as well as at least part of the jutted portion.

* * * * *